April 20, 1965 E. LISKA 3,178,818
INNER CUTTER FOR A DRY SHAVER FIXED TO BLADE CARRIER BY
COLLARS AND AN UNDETACHABLE COATING
Filed Aug. 13, 1962 4 Sheets-Sheet 1
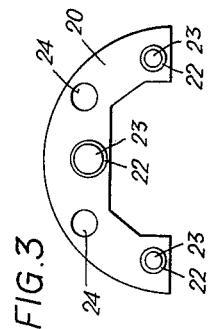
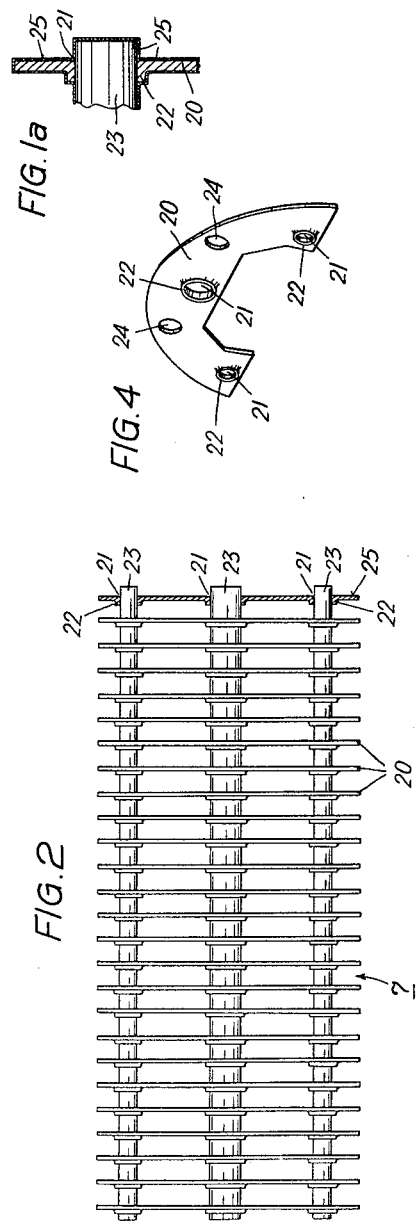
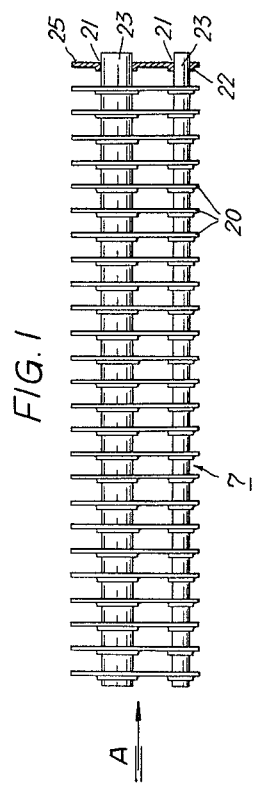

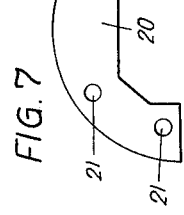
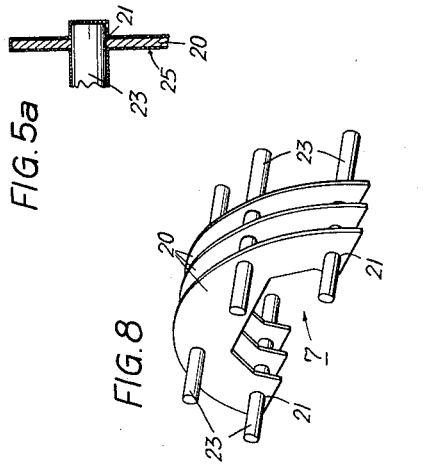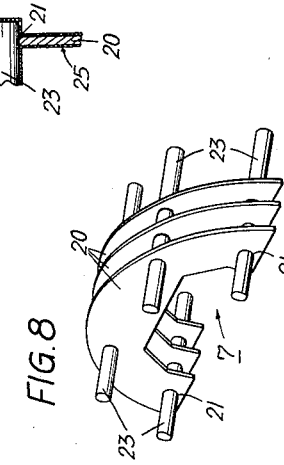
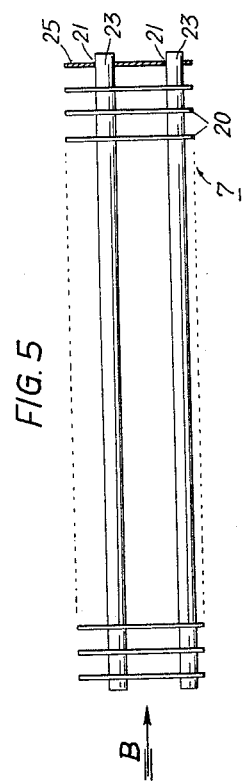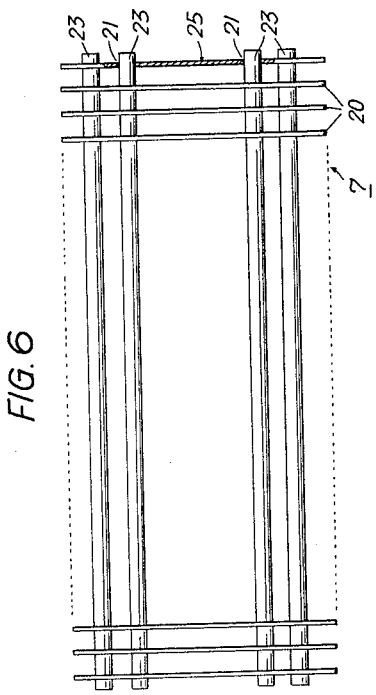

April 20, 1965     E. LISKA     3,178,818
INNER CUTTER FOR A DRY SHAVER FIXED TO BLADE CARRIER BY
COLLARS AND AN UNDETACHABLE COATING
Filed Aug. 13, 1962     4 Sheets-Sheet 3

United States Patent Office 3,178,818
Patented Apr. 20, 1965

3,178,818
INNER CUTTER FOR A DRY SHAVER FIXED TO BLADE CARRIER BY COLLARS AND AN UNDETACHABLE COATING
Erich Liska, Hitzendorf, near Graz, Austria, assignor to Payer-Lux, Gras, Austria, a firm
Filed Aug. 13, 1962, Ser. No. 216,569
Claims priority, application Austria, June 1, 1962, 4,466/62; June 18, 1962, 4,879/62
2 Claims. (Cl. 30—354)

This invention relates to inner cutters and in particular to inner cutters which are used in dry shavers and wherein said inner cutter comprises cutting blades and at least one blade carrying means.

According to the invention an inner cutter comprises cutting blades and at least one blade carrying means, said cuting blades having recesses and being fixed on the blade carrying means said fixing being effected by an undetachable metallic coat.

According to a preferred embodiment of the invention an inner cutter comprises cuting blades and at least one blade carrying means said cutting blades having recesses and being arranged parallel to each other and being fixed in spaced relationship on said blade carrying means said fixing being effected by an undetachable metallic coat.

A still further object of the invention is an inner cutter comprising cutting blades and at least one blade carrying means, said cutting blades having recesses and being fixed on the blade carrying means, said blade carrying means being a pin and the recess being an opening, said cutting blades being threaded at the blade carrying means, said blade carrying means being connected with the cutting blades by means of an undetachable metallic coat.

A still further invention is an inner cutter comprising cutting blades and at least one blade carrying means, said cutting blades having recesses and being fixed on the blade carrying means, said cutting blades being provided with collars having the same shape as the blade carrying means, said collars being integral with the cutting blade and being arranged coaxial to the recess, said collars being fixed on the blade carrying means by means of an undetachable metallic coat.

According to a preferred embodiment of the invention there is provided an inner cutter comprising cutting blades and at least one blade carrying means, said cutting blades having recesses and being fixed on said blade carrying means, said cutting blades being provided with collars having the same shape as the blade carrying means, said collars being integral with the cutting blade and being arranged coaxial to the recess, said collars being fixed on the blade carrying means by means of an undetachable metallic coat, said cutting blades being provided with at least two vent openings arranged in a distance from the cuting edge of the cutting blade of about 0.6 mm.

In known embodiments of inner cutters the cutting blades are inserted in slots, which slots are provided in a base plate by means of wire pins provided additionally. Said wire pins pass through all cutting blades. For fixing the cutting blades the pins are pinched between the cutting blades. By this method an inner cutter is produced in which, however, the effective fixing of the cutter blades is produced by inserting the cutting blades in the slots provided in the base plate. Only by means of the wire pins which pass through the cutting blades and which are pinched between the cutting blades a compact inner cutter is not obtainable. In the known assembly the wire pins only are a means for damping the vibrations but not a means for fixing the cutting blades. Besides the pinching of the wire pins between the cutter blades is very tedious. In the new embodiment described in this specification the fixing of the cutter blades on the cutting blade carrying means is effected in a new manner by a metallic coat. The new inner cutter is very economical to fabricate.

In producing the new inner cutter neither complicated nor expensive mechanisms must be used. The new cutter is of very light weight. The thickness of the coat is only 25μ. In operating the inner cutter in a dry shaver the movement of the inner cutter is a reciprocating movement. It is therefore advantageous that the masses to be moved only have a small weight, because at the end of each stroke all the moved masses must be stopped. As to the forces transmitted to the driving mechanisms of the dry shaver, it is advantageous to stop only light masses at the end of each stroke.

The metallic coat may consist of chromium, nickel, copper, zinc or tin. The coat can be surfaced to the cutting blades and the cutting blades carrying means by way of an electrolytical process, or by metallization (by a metal spray method) or by dip brazing or by dip soldering. The method of producing the new inner cutter consists in threading the cutter blades on the cutting blade carrying means, wherein after a preceding electrolytical roughening the coat is surfaced to the cutter blades and the cutter blade carrying means. By means of the coat a good metallic connection between the cutter blades and the cutter blade carrying means is ensured, whereby a steady heat flow is effected. The nickel or the chromium coat prevents adhering of hairs of a beard on the inner cutter.

The blade carrying means can be a pin or a tube. Preferably the recess is a circular opening. The cutter blades are threaded on the blade carrying means. The cutting blades can be provided with collars, having the same shape as the cross-section of the blade carrying means on which the cutter blades are threaded. Preferably the collars are made integral with the cutting blades. In this embodiment the collars are situated coaxial to the recess.

The invention will be readily understood from the accompanying drawings in which FIG. 1 is a front view of an inner cutter.

FIG. 2 is a plan view of the inner cutter shown in FIG. 1.

FIG. 1a shows in an enlarged scale a detail of FIG. 1, in which the undetachable metallic coat is entered.

FIG. 3 is a view taken in the direction indicated by the arrow A in FIG. 1.

FIG. 4 is a perspective view of a cutter blade used in the new inner cutter assembly.

A further embodiment of the inner cutter is shown in FIGS. 5 to 8. FIG. 5 is a front view of the above mentioned inner cutter.

FIG. 5a shows in an enlarged scale a detail of FIG. 5, in which the undetachable metallic coat is entered.

FIG. 6 is a plan view of the inner cutter shown in FIG. 5.

FIG. 7 is a view taken in the direction indicated by the arrow B in FIG. 5 and

FIG. 8 is a perspective view of a part of the inner cutter shown in FIGS. 5 to 7.

In FIGS. 1 to 8 those means are not indicated which are necessary to mount the inner cutter in a dry shaver and to transmit a reciprocating moving to the inner cutter.

Figure 9:
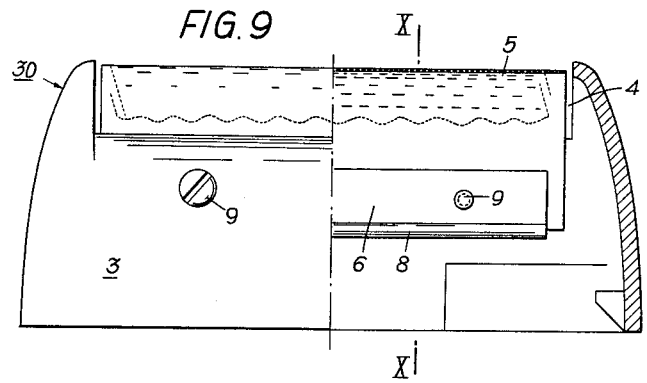

FIG. 9 is a fragmentary end view partly in section, showing a cutter head.

Figure 10:
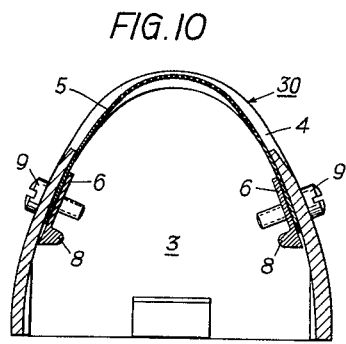

FIG. 10 is a section taken along line X—X in FIG. 9.

Figure 11:
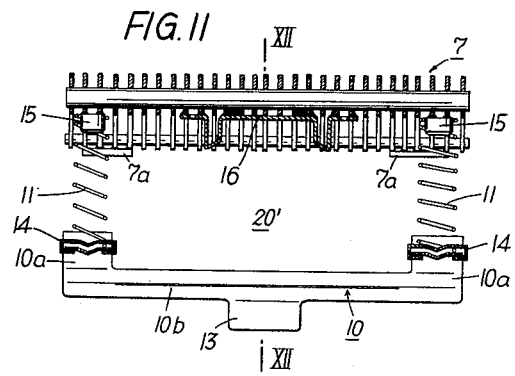

FIG. 11 illustrates a unit in which the inner cutter according to FIGS. 5 to 8 is mounted. The unit can be inserted as a whole into the cutter head.

Figure 12:
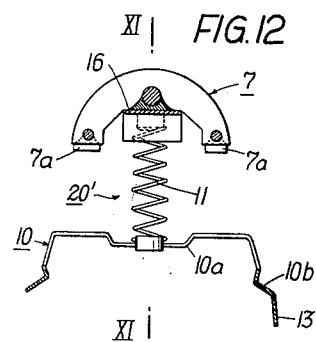

FIG. 12 shows a section taken along line XII—XII in FIG. 11.

Figure 13:
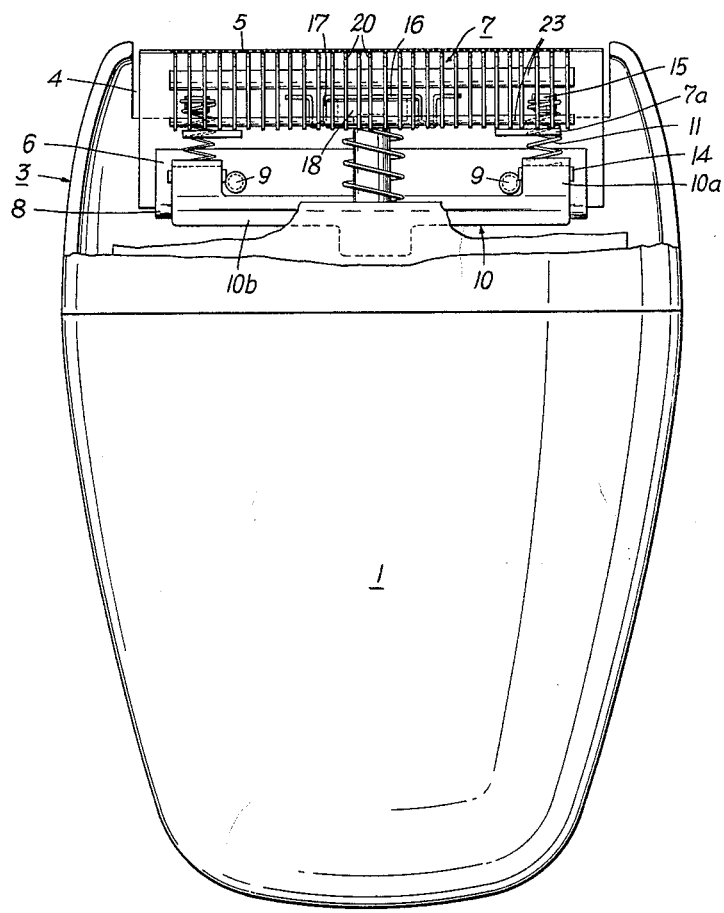

FIG. 13 shows the assembled shaver in a central sectional view. Instead of an inner cutter illustrated in FIGS. 5 to 8 also an inner cutter according to FIGS. 1 to 4 can be mounted in a dry shaver shown in FIG. 13. The mounting of the inner cutter shown in FIGS. 1 to 4 in the unit shown in FIGS. 11 and 12 can be made in the same manner as the mounting of the inner cutter shown in FIGS. 5 to 8 in this unit.

The reference number 7 indicates an inner cutter comprising a plurality of laminated cutter blades 20 arranged in spaced relationship and parallel to each other. Each cutter blade being provided with at least one recess, preferably, however, three or four recesses 21. The recesses 21 are bores of circular shape.

In the embodiment shown in FIGS. 1 to 4 the cutting blades 20 are provided with collars 22 having the same shape as the blade carrying means 23. The collars 22 being integral with the cutting blade 20 and being arranged coaxial to the recess 21. The cutting blades 20 are threaded on the cutting blade carrying means 23. The fixing of the blades 20 or the collars 22, respectively, on the cutting blade carrying means 23 is effected by a metallic, undetachable coat 25. This coat 25 being made of chromium, nickel, copper, zinc or tin. The metallic coat 25 is surfaced to the blades 20 and to the collars 22 by an electrolytic process or by metallization or by dip brazing or by dip soldering.

In the embodiment shown in FIGS. 1 to 4 each cutting blade 20 is provided with at least two additional openings 24 arranged in a distance of about 0.6 mm. from the edge of the cutting blade 20. The additional openings facilitate air circulation in the zone of the inner cutter mounted in the dry shaver.

In the embodiment illustrated in FIGS. 5 to 8 the side faces of the cutter blades are flat faces. In this embodiment no collar is provided. No additional openings are arranged for facilitating air circulation.

Referring to FIGS. 9 to 13 the cutter head 30 is secured to the body 1 of a dry shaver by usual locking means. These means may comprise e.g. two cams being arranged at opposite sides of the cutter head 30. These cams form an abutment in which abutment interlock two hook-shaped resiliently yielding clamping means (not shown) provided on the body 1. 3 is the cap of the cutter head body member of the cutter head 30. This cap 3 may consist of one piece, e.g. of plastic material or of metal. At its top the cap 3 is provided with a window-like opening 4, in which is inserted a cylindrically arched shear plate 5. The shear plate 5 is perforated and closes the window-like opening 4. By means of two bars 6 the shear plate 5 is secured to the cap 3. This securing action is made in such a manner that the longitudinal edges of the shear plate 5 can be inserted in the gap betwen the bars 6 and the walls of the cap 3 (FIG. 10). Thus the shear plate 5 is free to move to some extent in the transverse direction, so that convex curvature of the cutting blades 20 of the inner cutter 7 can snugly apply itself to the concave surface of the shear plate 5. The bars 6 are fixed to the cap 3 by means of two screws 9 in such a manner that the shear plate 5 inserted in the gap between the bar 6 and the wall of the cap 3 is retained. The bars 6 are provided with elongated beads 8. These beads 8 are arranged parallel to the longitudinal edges of the shear plate.

In the cap 3 (FIGS. 9 and 10) provided with the shear plate 5 the unit 20' illustrated in FIGS. 11 and 12 can be inserted. This unit 20' comprises a carrying frame 10, which consists preferably of a sheet metal stamping, two coil springs 11 and the inner cutter 7.

The carrying frame 10 has two U-shaped cross members 10a, each of which carries one of the coil springs 11. The coil springs 11 are situated in an offset middle part of the cross members 10a. To the inner cutter 7 four plugs 7a are fixed which serve as a stop for the inner cutter 7 on the carrying frame 10. The cross members 10a are interconnected by longitudinal members 10b, which have the cross-sectional shape of an outwardly open angle, so that they can embrace the elongated beads 8 of the bars 6. In this construction the cross members 10a act as two springs which retain the members 10b in clamped position on the beads 8. A lug 13 provided on one of the cross members 10b facilitates the removal of the carrying frame from the cap 3. The screws 9 are located at the corners of a quadrangle formed by the cross members 10a and the longitudinal members 10b so that the carrying frame 10 is held in position within the cap 3.

One end of the coil spring 11 is secured by means of a clip 14 to the middle of the cross member 10a. The other end of the coil spring 11 is secured by means of a plug 15 to the inner cutter 7. The plug 15 is fixed to the cutter blades 20 or the cutting blade carrying means 23 by means of glueing. Furthermore a strip 16 is secured to the inner cutter or to the cutting blades, respectively, by means of glueing. The strip 16 is substantially ]-shaped. Between the flanges of the ]-shaped part of the strip 16 a drive member 18, e.g. an oscillating pin is inserted. This pin is actuated by a motor (not shown) located in the body 1 of the shaver. Thus it is evident, that the inner cutter 7 is carried only by the coil springs 11. The coil springs 11 press the inner cutter 7 or the cutting edges of the cutter blades 20 against the shear plate 5. Thus the inner cutter 7 is in a snug engagement with the shear plate 5 in any phase of motion.

What I claim is:

1. An inner cutter comprising a plurality of separate and individual cutting blades, said blades being provided with smooth openings, blade carrying means extending through the openings in the blades to support the latter, said blades including integral collars concentrically bounding said openings and complementary in shape to the blade carrying means and having a height which is less than the spacing between adjacent blades, and surface coating means securing the collars to the blade carrying means for securing the blades thereto into spaced relation, said surface coating means including a metallic coating permanently bonded to said collars and said blade carrying means, said surface coating means constituting the sole means by which the cutting blades are secured to the blade carrying means.

2. An inner cutter as claimed in claim 1 wherein said blades are provided with further openings constituting vent openings.

References Cited by the Examiner

UNITED STATES PATENTS

| | | | |
|---|---|---|---|
| 1,618,996 | 3/27 | Powers | 29—503 X |
| 1,760,039 | 5/30 | Bundy | 29—503 X |
| 2,178,669 | 11/39 | Lougheed | 30—43.92 |
| 2,264,113 | 11/41 | Ericson | 30—43.6 |
| 2,286,443 | 6/42 | Scully | 30—43.92 |
| 2,423,595 | 7/47 | Hall | 30—43.1 |
| 3,045,344 | 7/62 | Cholet | 30—43.4 |

FOREIGN PATENTS

| | | |
|---|---|---|
| 523,032 | 7/40 | Germany. |
| 1,125,311 | 3/62 | Germany. |

WILLIAM FELDMAN, *Primary Examiner.*
EDWARD V. BENHAM, *Examiner.*